Dec. 24, 1929.    R. J. LOOCK    1,740,929
LUBRICANT RETAINING WASHER
Filed Sept. 14, 1927
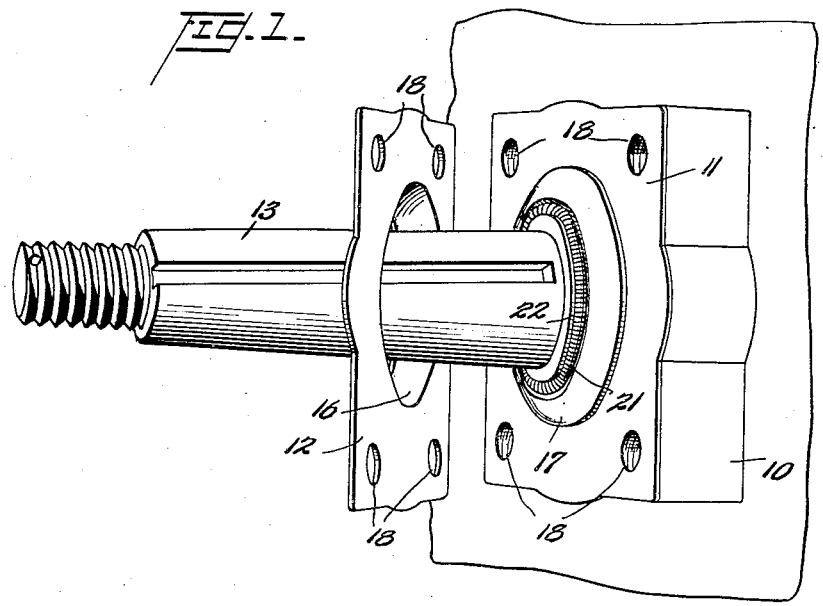
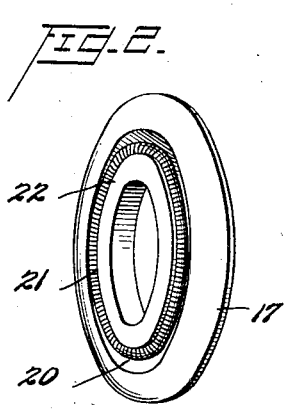
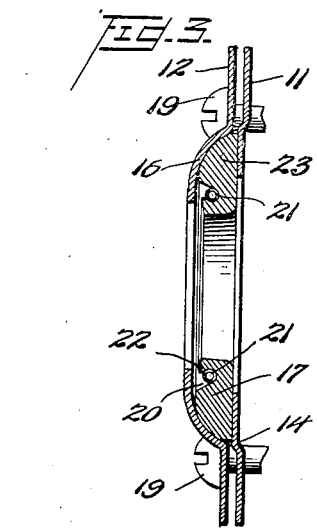
Inventor
Robert J. Loock
By Wm. D. Shoemaker
Att'y Patented Dec. 24, 1929

1,740,929

UNITED STATES PATENT OFFICE

ROBERT J. LOOCK, OF BALTIMORE, MARYLAND

LUBRICANT-RETAINING WASHER

Application filed September 14, 1927. Serial No. 219,501.

This invention relates to lubricant retaining washers, and particularly to such a washer as is used in an automobile for preventing the leakage of lubricant from the axle housing along the drive axle.

It has for its object the provision of a washer which will be durable, which will effectually hold back the grease or oil found in the axle housing of an automobile, and which will wear only very slightly in use, means being provided for compensating for such wear and for causing the washer at all times to fit the axle. It is also the object of the invention to provide a washer of the type just described from a thick disc of leather whereby economy of manufacture as well as of space in use is accomplished.

Like reference characters indicate like parts throughout the several figures of the drawing, in which Figure 1 is a perspective showing the end of a drive axle of an automobile with the washer parts being applied thereto;

Figure 2 is a perspective of the washer, and

Figure 3 is a section through the washer and associated plates.

Generally automobiles are constructed with a housing in which are mounted the differential gear and drive axles, the drive axle projecting from the end of the housing through the bearing block. Lubricant in the form of grease and oil is maintained in the housing, and it has always been a problem to prevent the leakage of this lubricant from the ends of the housing, where it finds its way to the brake drums on the rear wheels. Felt washers incased in retaining plates have been used for this purpose, but felt is very porous, readily absorbs the lubricant, permitting it to seep through, and wears quickly, requiring early replacement.

It has been found that a material, such as oil-oaked leather, is much more satisfactory because of several properties, namely, its toughness, its relative low porosity as compared with felt, and its ability to be compressed or flexed to grip the axle. This invention employs a material having these several qualities in a special manner to provide an efficient washer for the purpose, and the term "leather" as herein used has such meaning.

To the end of a bearing block 10 at the end of an axle housing of an automobile is a retaining plate 11 and a cap plate 12 through which the projecting end of the drive axle 13 passes. The retaining plate 11 is slightly dished as at 14.

The cap plate 12 is considerably dished as at 16, to provide a pocket for the grease retaining washer 17 between it and the plate 11. The two plates 11 and 12 are provided with the apertures 18 for the reception of bolts 19, by means of which they are secured to the bearing block 10.

The washer 17 is preferably made of a material which will not absorb lubricant readily and therefore permit the seeping through of the lubricant. It should also be of tough material which will not wear away quickly through contact with the revolving axle. It is also desirable to have in such a washer a certain pliability to permit a slight reshaping under pressure. Leather is a typical material having these characteristics when soaked with oil or grease. But any fabricated material having these properties would be useful in the manufacture of the washer.

The washer is cut from a piece of leather in the form of a thick disk with a central aperture therein of a size to fit the drive axle end. In one side face of the washer is provided a groove 20 cut at an angle to the face of the washer and forming an inwardly slanted pocket for an annular coil spring 21. This groove is shown as having a depth of about one-half the thickness of the washer. The coil spring 21 is retained in the groove by the lip 22 and acts upon the central portion of the washer to distort or dish that portion in order to give to the central opening therein a slightly conical form to fit the axle. It will be noted that the outer portion 23 of the washer is firmly clamped between the plates 11 and 12, but that there is a clearance between the plate 12 and the washer at the point where the groove 20 is formed, and also that the opening in the plate 11 is relatively large, whereby the central portion of the washer is permitted a slight freedom of movement. By this construction of the parts, the central portion of the washer may be flexed or shaped under the influence of the spring 21 to snugly fit the projecting end of the axle, and when the washer wears slightly from continuous contact with the revolving axle, the spring 21 will further distort or flex the central portion of the washer to cause it to compensate for such wear.

It will be appreciated that the washer formed as described produces an effective grease retaining washer, that the toughness of the material avoids the wearing away of the washer in use, and that such wear as does occur is compensated for by the tendency to grip the axle produced by the spring 21, and that the spring also causes the washer to conform to the shape of the axle end by causing it to assume a slightly conical form. The relatively low porosity of the material prevents the seepage of lubricant through the body, while its ability to become oil soaked adds to its pliability and therefore permits the spring to produce the necessary distortion.

What is claimed is:

A washer consisting of single piece of leather in the form of a thick disc with a central aperture therein, one face being provided with a groove cut at an angle to the face and forming an inwardly slanted pocket, and a coiled spring in said pocket acting upon approximately one-half the thickness of the central portion to contract the central aperture so that it will assume a conical form to snugly fit the axle upon which the washer is mounted.

In testimony whereof, I affix my signature.

ROBERT J. LOOCK.